United States Patent
Everett et al.

(10) Patent No.: US 7,233,660 B2
(45) Date of Patent: Jun. 19, 2007

(54) METHOD AND SYSTEM FOR EXTENDING BACKUP BATTERY LIFE IN PRIMARY LINE CUSTOMER PREMISES-EQUIPMENT

(75) Inventors: Kenneth Wayne Everett, Hoschton, GA (US); Bruce McClelland, Alpharetta, GA (US)

(73) Assignee: Arris International, Inc., Suwanee, GA (US)

( * ) Notice: Subject to any disclaimer, the term of this patent is extended or adjusted under 35 U.S.C. 154(b) by 234 days.

(21) Appl. No.: 10/430,860

(22) Filed: May 5, 2003

(65) Prior Publication Data

US 2003/0224835 A1 Dec. 4, 2003

Related U.S. Application Data

(60) Provisional application No. 60/377,419, filed on May 3, 2002, provisional application No. 60/447,474, filed on Feb. 14, 2003.

(51) Int. Cl.
*H04M 1/00* (2006.01)
(52) U.S. Cl. .................... 379/413; 379/399.01
(58) Field of Classification Search ........... 379/399.01, 379/413, 413.01
See application file for complete search history.

(56) References Cited

U.S. PATENT DOCUMENTS

| 5,815,569 A * | 9/1998 | Akhteruzzaman ...... 379/399.01 |
| 6,625,281 B1 * | 9/2003 | Bernard ...................... 379/413 |
| 6,880,093 B1 * | 4/2005 | Lyles ......................... 713/300 |
| 2004/0057576 A1 * | 3/2004 | Lavaud et al. .............. 379/413 |
| 2004/0213404 A1 * | 10/2004 | Posthuma ................... 379/413 |

* cited by examiner

*Primary Examiner*—Jefferey F. Harold
(74) *Attorney, Agent, or Firm*—John Doughty

(57) ABSTRACT

Current to a relay causes a telephone to be connected to a SLIC. Following LOOP, a sleep switch opens to interrupt current to the power supply converter after a first predetermined period expires. If the telephone is on-hook, loss of current to the relay causes disconnection from the SLIC, but causes connection to a battery.

Current sensed from the battery through an off-hook hook switch generates a current signal. The current signal closes a current switch, which is in parallel with the open sleep switch, thereby providing a current path to the converter. The sleep switch then makes and then the current switch breaks.

After awakening, a ring-back signal informs a user that telephony service has been restored and a message may indicate that telephony service is being sought. When the telephone is placed back on-hook, counting of a second predetermined period starts, after which the sleep switch opens again.

29 Claims, 2 Drawing Sheets

Circuit is shown in deep sleep mode

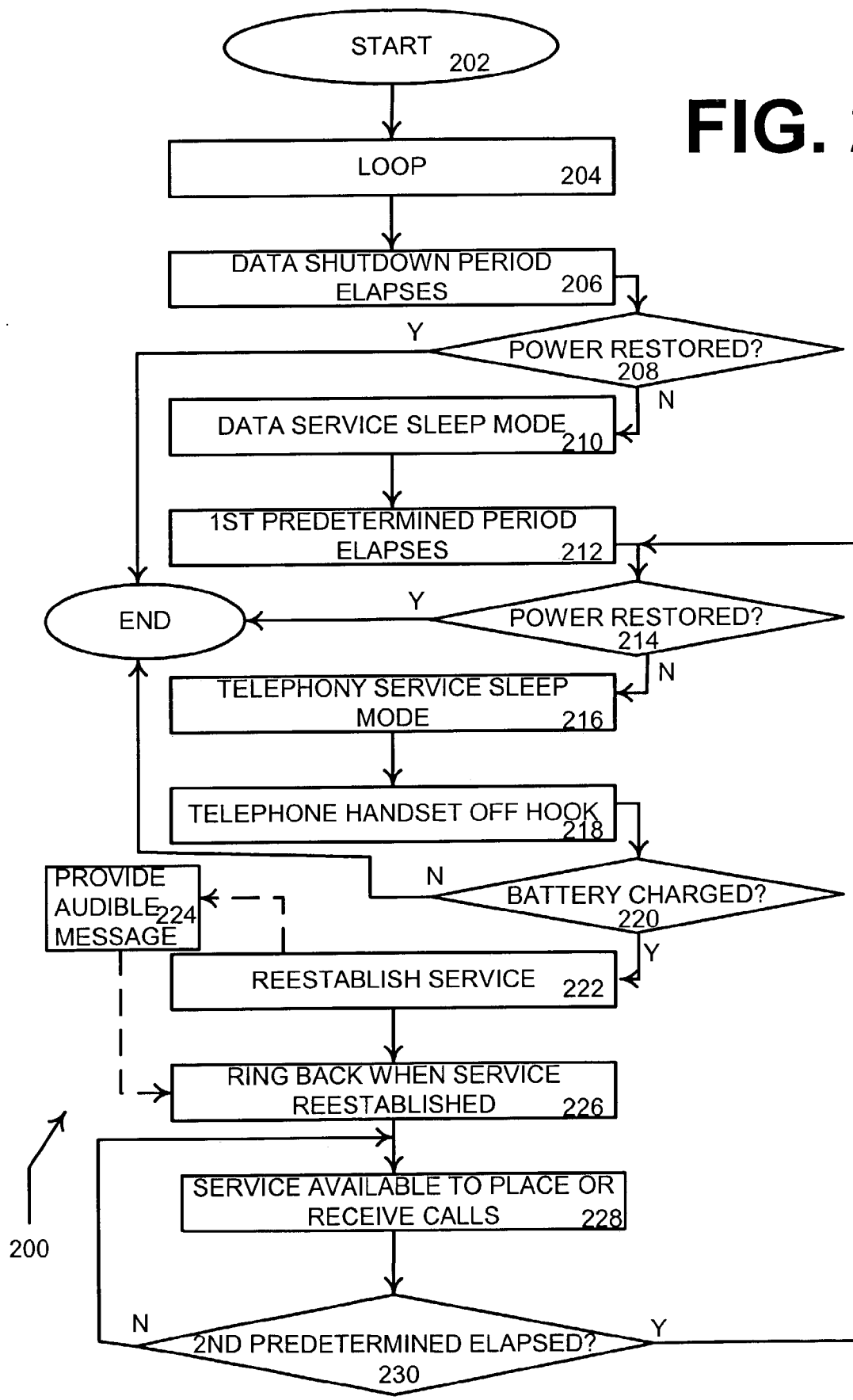

METHOD AND SYSTEM FOR EXTENDING BACKUP BATTERY LIFE IN PRIMARY LINE CUSTOMER PREMISES-EQUIPMENT

CROSS REFERENCE TO RELATED APPLICATION

This application claims the benefit of priority under 35 U.S.C. 119(e) to the filing date of Everett, U.S. provisional patent application No. 60/377,419 entitled "Extension of Battery Life for Battery Backed-up Primary Line CPE by Gradual Degradation of Service and Providing Reserve Battery Capacity to Place Outgoing Calls", which was filed May 3, 2002, and is incorporated herein by reference in its entirety. This application also claims priority under 35 U.S.C. 119(e) to the filing date of Everett, et. al, U.S. provisional patent application No. 60/447,474 entitled "Conditions to Terminate Deep Sleep Mode and Notify Customer of Phone Service Availability", filed on Feb. 14, 2003 which is herein incorporated by reference in its entireties.

FIELD OF THE INVENTION

The present invention relates to preserving battery life in a battery back up system, and more particularly, to preserving said battery life in a cable modem telephony system such that telephony services, including emergency services, may be accessed during extended utility power outages.

BACKGROUND

While many users, including consumers as well as commercial users, subscribe to telephony services that are delivered using plain old telephony service ("POTS") networks, users are increasingly subscribing to telephony services that are delivered by means other than POTS. For example, as more and more users subscribe to Internet services, these same users are beginning to receive more than just Internet data services from the Internet providers. Also, community antenna television ("CATV") subscribers are being offered the providing of services other than broadcast video, using the CATV network infrastructure.

Users have come to expect high reliability from POTS service. Even during severe weather events, POTS service is still typically available, with damage to aerial wires carrying signals in the network being the prime cause of interrupted service. As long as the network conductors, wires and cables are intact, a power loss to a user's location typically does not interrupt POTS service, because the electrical power to operate the system, including the provider's central office as well as the user's telephony equipment, is supplied from the central office. Even if the central office looses offsite power supplied from a utility company, the central office power supply is typically backed up by batteries and temporary electric generators, such as a diesel generator, for example. Thus, even during a power outage at a user's location, users can typically place and receive important telephone calls to determined whether loved ones are safe or to determine whether the utility power service will be restored soon. More importantly, however, a user can place a call to emergency personnel in case someone at the user's location has been injured, typically by entering the universally familiar 911 number sequence.

While the other means of providing telephony services mentioned above are typically reliable, equipment of these POTS-alternatives at a user's location often requires a local power source, such as standard household AC current. For example, if telephony service is provided via an Internet connection, a user would typically need a computer that operates using household power and would need a power backup in case of offsite power loss. Although users may have gasoline or diesel generators, the power backup systems for computers, especially in consumer installations, are typically battery backed-up.

In addition to computers, telephony can also be provided over the internet, but not necessarily through a computer. This is known as voice-over-IP ("VoIP") and may be provided over a CATV network using devices, such as for example, a VOICE PORT® product as marketed by ARRIS International, Inc. Such network interface devices that interface a user's equipment with a network typically receive a digital data stream using Internet protocol ("IP") and convert the digital data into an analog signal before being used by a user. Power to these products is typically provided from household current sources, which makes the VOICE PORT® and similar products, such as cable modems, for example, susceptible to loss-of-offsite-power ("LOOP") events, such as may occur during an ice storm or tornado, for example.

To provide power backup for a LOOP event, batteries are typically used. Rechargeable batteries provide an adequate backup for short duration LOOP events, such as may occur during scheduled maintenance by a utility company, inadvertent damage to power lines by a maintenance worker, or a transformer explosion, for example, which can typically be serviced within a few hours. However, for more extended power outages, which may result from widespread power system damage caused by extreme weather conditions, for example, the depletion life of a fully recharged battery may not be as long as the power outage duration if the telephony equipment remains fully powered during the extent of the power outage.

Thus, there is a need for a method and system for providing battery backup of a device used in a non-POTS telephony system at a subscriber's premises that extends the functional backup period that a battery system can reliably supply power to said telephony device.

SUMMARY

It is an object to provide a method and system for placing a non-POTS telephony device in a low power state, or "sleep mode," after a predetermined amount of time has elapsed following a LOOP event. It is also an object to provide for disabling of data services, including home networking, after a predetermined amount of time has elapsed following a LOOP event. It is also an object that said method and system provide convenient "wake up" from said sleep mode when a user attempts to place a telephone call while the telephony circuitry is in sleep mode. It is also an object to provide a tell-tale signal to the user when the power supply has "awakened" from sleep mode and that connection between the telephony handset, or other user interface, has been established with the service provider's telephony/data network.

The system uses a processor to determine when a first predetermined time period has elapsed following a LOOP event. Upon this first time period having elapsed, a sleep switch between the battery and a switching device, such as, for example, a relay, is opened, and input power is removed from the main power supply. When current to the relay is interrupted, the configuration of contact points of the relay are changed so that the connection between the telephony handset and its corresponding subscriber line interfaced card ("SLIC") is changed. When this configuration is changed, instead of being connected to the SLIC, the use of which is known in the art, the telephony handset is connected to the battery, with the only switch then breaking the current flow path between the handset and the battery is the flash hook of the telephony handset. When the handset is 'on hook', the circuit is broken and no current flows between the battery and the handset.

When a user begins the process of placing a call while the power supply system is in sleep mode by lifting the handset into an 'off hook' position, current flows from the battery through the handset. This current flow is sensed by a current sensing means, which outputs a current flow signal to an open current switch. This current switch is typically parallel to the sleep switch, so that when the current flow signal is received by the current switch, the current switch closes, thereby causing current to flow to the coil of the relay and input power to be applied to the main power supply. When current is flowing through the relay coil, the relay contact points are configured so that the telephony hand set is connected to the SLIC. Therefore, with the sleep switch open, as is the case when the battery backup system is in sleep mode, placing the telephony handset in the off hook position causes the relay contacts points to change from the sleep mode configuration to the operational configuration. This places the telephony handset in connection with the SLIC so that communication using the telephony device can occur.

When connection between the handset and the SLIC is made, there is often a lapse of time between the handset being electrically connected and the completion of initialization routines in the network interface device. Such initialization routines may include ranging and registering with the central office or head of the service provider to establish dial tone. Thus, an audible tone sequence, or other programming may be provided to the handset receiver to inform the user that the telephony equipment is 'awake', or active, but not yet able to make a call. In addition, the ranging and registering process may take a substantial amount of time, typically about 45 seconds to one minute. Due to this delay, a user may place the handset back on hook, thinking that service will not be established, or just to wait for said service to be established without keeping the handset placed to the ear. Thus, a 'service established' signal may be provided to inform the user that service has been established and the equipment is ready for communication use.

The service established signal may include a ring-back signal, where the telephony equipment uses its audible ringing system to inform the user that service has been established and dial tone is present. The ring back signal may be a unique ringing pattern, or a unique tone, that a user can distinguish from other ringing signals, such as alerting of an incoming call, which is the most common use of a telephony ringing system.

When a call that was placed after the power supply was awaked from its initial sleep mode has ended by placing the handset back on hook, the processor determines whether a second predetermined period has elapsed. If the amount of time that has elapsed since the termination of such a call equals the predetermined second period, the power supply is placed back into sleep much as described above. When a user wishes to place a call again, the same process is followed for waking up the power supply as described above.

BRIEF DESCRIPTION OF THE DRAWINGS

FIG. 2 illustrates the steps of a method for disconnecting power from telephony equipment during a LOOP to extend battery life.

DETAILED DESCRIPTION

Figure 1:
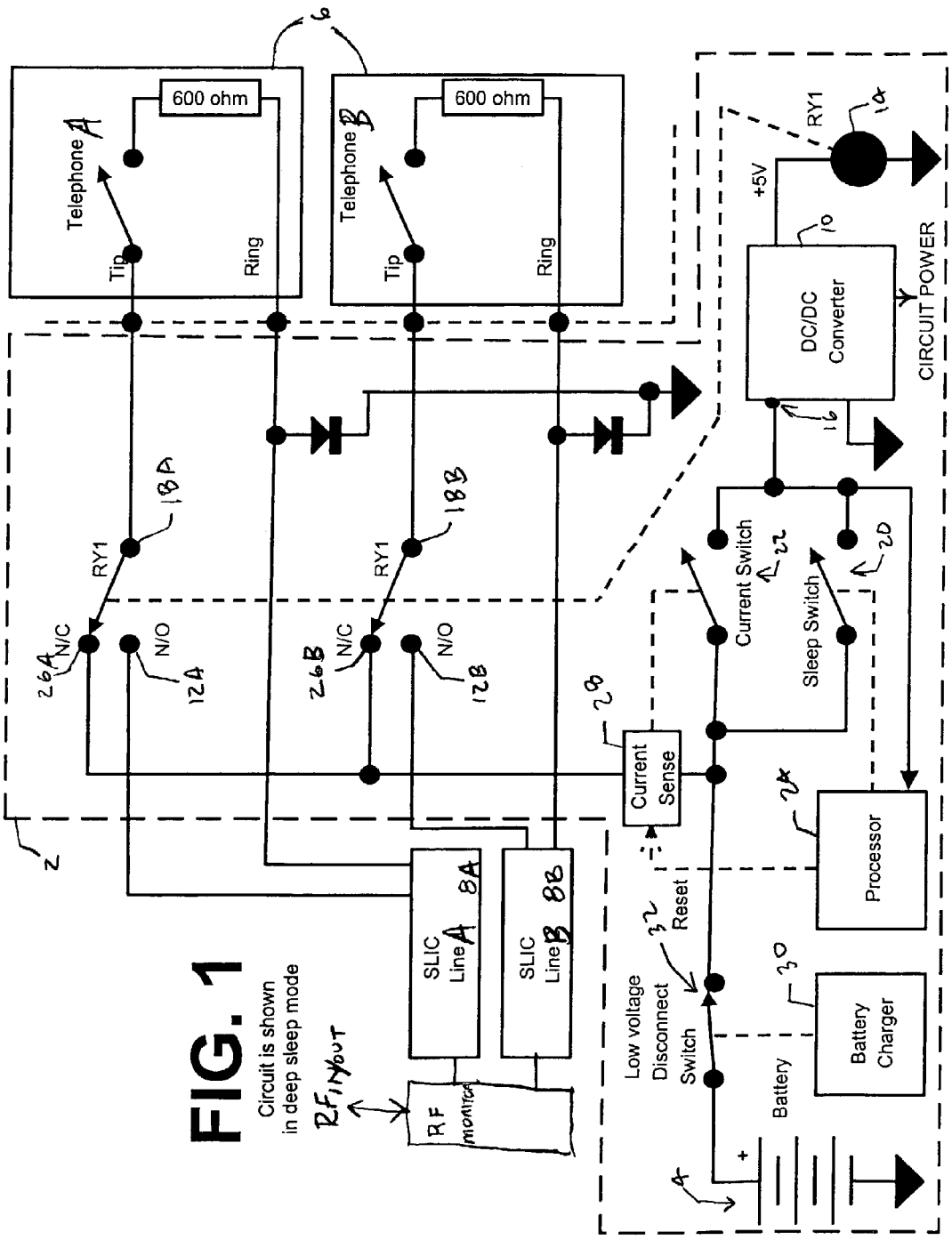
FIG. 1 illustrates a schematic diagram for a circuit for disconnecting power from telephony equipment during a LOOP to extend battery life.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to the figures, FIG. 1 illustrates a schematic diagram of a telephony circuit 2 for disconnecting power from telephony equipment during a LOOP to extend the time to depletion of backup battery 4. Battery 4 is used to provide backup power during a LOOP event to telephones 6A and 6B, which may be telephone handsets that transmit and receive audio signals using IP. During normal operation when offsite utility power is available, circuit power is provided to SLICs 8A and B from DC/DC converter 10. During normal operation, telephones 6 are connected to their corresponding SLICs 8 through SLIC contact points 12A and 12B, which are part of relay 14. It will be appreciated that only two telephony lines A and B are illustrated in the figure for clarity, but more or less than two lines may be supported in practice.

As long as current from battery 4 flows to input 16 of converter 10 during a LOOP event, TIP contacts 18A and 18B are connected to contacts 12A and 12B respectively. At the beginning of a LOOP event, sleep switch 20 is in the closed position (the switch contacts are 'made up') and current switch 22 is in the open position (the switch contacts are 'broken'). Thus, current from battery 4 has a path to converter 10 such that the contacts 18 are connected to contacts 12.

After a first predetermined amount of time has passed since the start of the LOOP condition, processor 24, which determines whether the first predetermined amount of time has passed, causes sleep switch 20 to open, thereby eliminating current flow between battery 4 and converter 10. Upon this cessation of current flow, the position of contacts changes within relay 14 so that instead of TIP contacts 18 being connected to contacts 12, the TIP contacts are now connected to wake contact points 26. It will be appreciated that the dashed line connecting relay 14 and the contact points 12, 18 and 26 is shown to indicate that the contact points are typically mechanically connected to the relay and part thereof, and that therefore the configuration of the contact points changes in response to current flowing through the coil of relay 14. Accordingly, for brevity, henceforth the coil of relay 14 may be referred to as 'coil 14' rather than 'the coil of relay 14.'

After points 18 have been changed to form a connection with points 26 following the expiration of the first predetermined period, current does not flow from battery 4 through telephones 6 because the telephone handsets are on hook. It will be appreciated that the contact point configuration will not change in response to the opening of sleep switch 20, even though processor 24 determines that the first predetermined period has elapsed, if one or more of telephones 6 are off hook. Rather, processor 24 will determine whether any of the telephones 6 are in use, and if so, will postpone opening of sleep switch 20 until none of the telephones are in use. Processor 24 will typically receive information regarding whether the phones are in use from connections to SLICs 8. These connections are not shown in the figure for clarity.

Upon opening of sleep switch 20, there is practically no current flowing from battery 4, except for a negligible amount that may flow through the monitoring section of current sensing means 28, which may comprise solid state circuitry, or a simple current transformer having secondary output current being applied to current switch 22. A small amount of current may also typically flow through battery monitoring circuitry while circuit 2 is in sleep mode.

When one of the telephone handsets 6 is placed in an off hook position, current flows from battery 4 through current sensing means 28 because contacts 18 are connected to contacts 26 and the telephone flash hook switch is made up, thus forming a complete circuit between the positive terminal of the battery and ground. This current flowing through sensing means 28 causes the sensing means to output a current signal to current switch 22, thereby causing the current switch to close. When current switch 22 is closed, current from battery 4 flows to converter 10, which passes current to coil 14, thereby causing the contact points to change states so that TIP contact points 18 are connected to SLIC contact points 12 instead of wake points 26, to which said TIP points are connected during sleep mode. It will be appreciated that the wake points 26 are so named because the current that flows through them when one or more of the handsets of telephones 6 are placed in their respective off hook positions causes circuit 2 to transition from sleep mode to wake mode.

Following call termination after circuit 2 has awakened, processor 24 measures a second predetermined period, and causes the circuit to enter sleep made as described above after the second predetermined period has elapsed. This is accomplished by sending a reset signal from processor 24 to the control mechanism of current sensor 28 that operates current switch 22. It will also be appreciated that when circuit 2 awakens from sleep mode, processor 24 causes sleep switch 20 to close and current switch 22 to open. The second predetermined period is typically shorter than the first predetermined period, which is preferably about four hours. Accordingly, the second predetermined period may preferably be ten minutes, but could be more or less. Thus, the operation of circuit 2 allows the energy stored in battery 4 to be depleted over a longer period of time than if the battery was constantly connected to converter 10, because when the circuit is in sleep mode, very little current is drawn from the battery, as opposed to the larger amounts of current that are drawn when SLICs 8 are constantly energized and awaiting telephony activity. It is noted that when circuit 2 has entered the second phase of backup operation, which commences when the circuit is placed in sleep mode following the expiration of the first predetermined period, or phase of operation, battery charger 30, which monitors the voltage level of the battery, may cause disconnect switch 32 to interrupt power if the voltage is so low as to cause damage to the battery. Thus, if the contacts of disconnect switch are broken, the battery has effectively been depleted and the system will no longer function until the household current supply is restored.

Turning now to FIG. 2, the steps of a method 200 to extend the battery life of a backup system for a telephony circuit is illustrated. Method 200 starts at step 202 with the telephony circuit operating under normal conditions with sleep switch 20, as shown in FIG. 1, in the closed position. When a LOOP occurs at step 204 a timer begins, and after a predetermined data shutdown period has elapsed at step 206, method 200 determines whether offsite power has been restored at step 208. If so, algorithm 200 ends and the telephony circuit continues operation in the normal mode with power being supplied from the offsite power source. If power has not been restored at step 208, data services, such as Internet access, video signal processing, or home networking, for example, are disabled and placed into a sleep mode at step 210. This is typically done by sending a signal from the processor to circuitry, which is known in the art, that controls such services. It will be appreciated that this data shutdown period is in addition to the first and second predetermined periods discussed in reference to FIG. 1. However, data shutdown could also either coincide with the LOOP event at step 204, or with the expiration of the first predetermined period discussed above. This is merely discussed to make it clear that data may or may not be shut down at different times from that of the shutdown of telephony services when the telephony circuit is placed in sleep mode.

After the first predetermined period expires with respect to telephony services at step 212, it is determined whether offsite power has been restored at step 214. If so, the routine ends and the telephony circuit remains in normal operation mode with the sleep switch in the closed position. However, if offsite power has not been restored at step 214, then the telephony circuit is placed in sleep mode at step 216, as described in reference to FIG. 1 above.

Once the telephony circuit is in sleep mode, current draw by the circuit from its backup battery is very near to being zero, as opposed to being approximately a few hundred mA during the normal mode when no telephony calls are being processed. The main contributor to the negligible current draw during sleep mode is battery charger monitoring and onboard supervisory services performed by some of the circuitry of the telephony circuit.

When the handset of any of the telephones served by the SLICs of the telephony circuit is placed in the off hook position at step 218, the battery charger determines whether the backup battery has sufficient voltage to operate the telephony circuitry safely at step 220. If not, process 200 ends. If the battery is determined to have sufficient charge to operate the circuitry safely, the process of reestablishing service to facilitate placing a call is begun at step 222.

As discussed in reference to FIG. 1, service is typically not immediately established to the SLICs 8 upon the reconnection of contact points 18 to contact points 12. There is usually a matter a a few seconds until a call may be placed following the circuitry's emergence from sleep mode. This is because the network interface device has to complete its initialization routines including ranging and registering, as known to those skilled in the art, with the service provider's head end or central office. If a would-be caller is under duress, such as may be the case during an emergency situation when electric power service has been interrupted to a home or business location when it is dark outdoors, said caller may place the telephone handset back on hook in frustration at not hearing a dial tone in the receiver. If this is the case, the caller may think that the telephone service is not available and may fail to try again, after the initialization process is complete.

To alleviate this forfeiting of the availability of placing a call when needed, the telephony line associated with the particular telephone may be programmed to play an audible tone sequence or a verbal message at step 224 to inform the user that service will be restored soon. In addition, the preferred embodiment implements a feature that causes a ring-back of the telephone at step 226 when the initialization process has been completed. This ring-back can be a unique ring tone or a unique ring pattern, a combination of both, or some other indicator, such as, for example, the illumination of a red light on the front of the telephone set. Once telephony service has been reestablished, a call may be placed at step 228.

After the call placed at step 228 has been completed, it is determined at step 230 whether a second predetermined period has elapsed. If not, the telephony circuit remains powered in the normal operating mode, and is ready to receive another call. If the second predetermined period has elapsed, routine 200 determines whether offsite power has been restored at step 214. If so, program 200 ends. If not, the telephony circuit is placed in sleep mode again at step 214 until a telephone is placed off hook again, or until offsite power has been restored, the occurrence of which is automatically detected by converter 10 shown in FIG. 1.

It will be appreciated that when offsite power is supplied to converter 10, coil 14 is energized, thereby causing contacts 18 to change from being connected to the wake contacts 26 to the SLIC contacts 12, thereby returning the circuit 2 to normal operating mode. When processor 24 detects this, it closes sleep switch 20 so that current can flow from converter 10 to battery 4 to recharge it.

It will also be appreciated that the termination of each call that is placed after the telephony circuit has been awaked when the telephone is placed in the off hook position restarts the timer that determines whether the second predetermined period has elapsed. Thus, a succession of calls placed while the telephony circuit is awake following awakening from sleep mode may result in the circuit never entering sleep mode until the battery charge has been depleted.

The second predetermined period will typically be selected to be less that the first predetermined period. Thus, during the first predetermined period the circuit stays on without entering sleep mode for a time period that is typically longer than the amount of time that electric power is unavailable due to, for example, a maintenance outage, a tripped circuit breaker due to high demand, a defective transformer, or a brownout or blackout due to demand exceeding generating capacity. However, once this first predetermined period has elapsed, it is likely that the cause of the LOOP is something less temporary, such as damage to power transmission or distribution infrastructure due to an ice storm or tornado activity, for example.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A system for extending the depletion life of a back-up battery in a communication system following a loss of off-site power event comprising:
   a means for switching one or more telephony equipment devices between being connected to either the battery or one or more SLICs corresponding to the one or more telephony equipment devices,
   a sensing means for providing a current flow signal in response to current flowing from the battery to the telephony equipment device;
   a current switch for providing a current path between the battery and the switching means in response to the current flow signal provided by the sensing means; and
   a sleep switch for breaking the path of current flowing to the switching means in response to a time elapsed signal.

2. The system of claim 1 wherein the switching means is a relay having a coil and a set of contact points, the set of contact points including one or more tip, or ring, contact points connected to tip, or ring, conductors of the one or more telephony devices, one or more SLIC contact points connected to tip conductors of the one or more SLICs and one or more wake contact points, which provide a current path between the battery and the tip conductors of the one or more telephony equipment devices when the wake contact points and the corresponding tip contact points are connected to each other, the tip and SLIC contact points being connected when current is flowing through the coil.

3. The system of claim 1 wherein the switching means is a solid state device capable of connecting a plurality of tip, or ring, connection points to either a plurality of SLIC connection points or a plurality of wake connections points in response to the current flow signal.

4. The system of claim 1 further comprising a processor for providing the time-elapsed signal to the sleep switch.

5. The system of claim 4 wherein the processor provides the time-elapsed signal after a first predetermined period has elapsed, and provides the time-elapsed signal after a second predetermined period has elapsed if the time-elapsed signal has already been provided in response to the first predetermined period having elapsed.

6. The system of claim 4 wherein the processor provides the time-elapsed signal after a data shutdown period has elapsed.

7. The system of claim 1 wherein the current switch and the sleep switch are solid state devices.

8. The system of claim 4 further comprising a converter for supplying electrical power to circuitry components, the circuitry components including the telephony equipment devices, the switching means, the SLICs, the processor and circuitry of an associated network interface device, the converter capable of receiving power from offsite power, or from the battery through either the sleep switch, the current switch, or both, the sleep switch and current switch, said switches being in parallel with each other between the battery and the converter.

9. The system of claim 8 wherein when the sleep switch and the current switch are in the open position, the converter and the components it provides power to are in a sleep mode such that electrical power from the battery does not have a path to the converter.

10. The system of claim 9 wherein the sleep mode will not occur when one of the telephony equipment devices is off hook.

11. equipment devices from on hook to off hook provides a current path from the battery through said telephony equipment device, current flows through said current path causing the sensing means to provide the current signal to the current switch, thereby causing the current switch to close and current from the battery to flow to the converter, thereby causing the switching means to connect said telephony equipment device to its corresponding SLIC.

12. The system of claim 1 further comprising a means for disabling data services, including home networking services.

13. A system for extending the depletion life of a back-up battery in a CMTS communication system at a user's location following a loss of off-site power event comprising:
   a relay for switching one or more telephony equipment devices between being connected to either the battery or one or more SLICs corresponding to the one or more telephony equipment devices, said relay having a coil for receiving a signal for causing said switching to occur;
   a sensing means for providing a current flow signal in response to current flowing from the battery to the telephony equipment device through a flash hook switch in at least one of the one or more telephony devices that is off hook;
   a current switch for providing a current path between the battery and the switching means in response to the current flow signal provided by the sensing means; and
   a sleep switch for breaking the path of current flowing to the switching means in response to a time elapsed signal.

14. The system of claim 13 wherein the relay has a set of contact points, the set of contact points including one or more tip contact points connected to tip conductors of the one or more telephony devices, one or more SLIC contact points connected to tip conductors of the one or more SLICs and one or more wake contact points, which provide a current path between the battery and the tip conductors of the one or more telephony equipment devices when the wake contact points and the corresponding tip contact points are connected to each other, the tip and SLIC contact points being connected when current is flowing through the coil.

15. The system of claim 13 wherein the switching means is a solid state device capable of connecting a plurality of TIP connection points to either a plurality of SLIC connection points or a plurality of wake connections points in response to the current flow signal.

16. The system of claim 13 further comprising a processor for providing the time-elapsed signal to the sleep switch.

17. The system of claim 16 wherein the processor provides the time-elapsed signal after a first predetermined period has elapsed, and provides the time-elapsed signal after a second predetermined period has elapsed if the time-elapsed signal has already been provided in response to the first predetermined period having elapsed.

18. The system of claim 16 wherein the processor provides the time-elapsed signal after a data shutdown period has elapsed.

19. The system of claim 13 wherein the current switch and the sleep switch are solid state devices.

20. The system of claim 16 further comprising a converter for supplying electrical power to circuitry components, the circuitry components including the telephony equipment devices, the switching means, the SLICs, the processor and circuitry of an associated network interface device, the converter capable of receiving power from offsite power, or from the battery through either the sleep switch, the current switch, or both the sleep switch and current switch, said switches being in parallel with each other between the battery and the converter.

21. The system of claim 20 wherein when the sleep switch and the current switch are both in the open position, the converter and the components it provides power to are in a sleep mode such that electrical power from the battery does not have a path to the converter.

22. The system of claim 21 wherein the sleep mode will not occur when one of the telephony equipment devices is off hook.

23. The system of claim 22 wherein during sleep mode a transition of one of the telephony equipment devices from on hook to off hook provides a current path from the battery through said telephony equipment device, current flows through said current path causing the sensing means to provide the current signal to the current switch, thereby causing the current switch to close and current from the battery to flow to the converter, thereby causing the switching means to connect said telephony equipment device to its corresponding SLIC.

24. The system of claim 13 further comprising a means for disabling data services.

25. A method for extending the depletion life of a battery that provides back-up power to one or more telephony equipment devices during a loss of off-site power event comprising:
   disconnecting the telephony equipment devices from corresponding SLICs by placing a telephony circuit into a sleep mode after a first predetermined time period has elapsed;
   providing a current path between the battery and the telephony equipment devices when said telephony circuit is placed in said sleep mode, said current path being broken when the telephony equipment device is on-hook;
   sensing current in the current path when the telephony equipment device is off-hook to provide a current flow signal while current is flowing in the current path; and
   placing the telephony circuit into an awakened state in response to said current flow such that the telephony equipment devices are connected to their corresponding SLICs.

26. The method of claim 25 further comprising providing an audible message that telephony service is being reestablished to the SLICs following the telephony circuit being placed in said awakened state after being in said sleep mode.

27. The method of claim 25 further comprising providing a ring-back signal to the telephony equipment devices upon telephony service being reestablished to the SLICs.

28. The method of claim 25 further comprising placing the telephony circuit into said sleep mode following the expiration of a second predetermined period, wherein measurement of the second predetermined period starts when current flow through the current path ceases at the completion of a telephone call placed after the telephony circuit had been awakened from said sleep mode.

29. The method of claim 25, wherein telephony services are provided to the telephony equipment devices through a network interface device, further comprising disabling circuitry in the network interface device that supports data services following expiration of a data shutdown period, wherein the data shutdown period expires before the telephony equipment devices are placed into sleep mode.

* * * * *